Sept. 29, 1964  R. H. CHAPMAN ETAL  3,150,903
FRAME STRUCTURE FOR CABINETS AND THE LIKE
Filed Oct. 22, 1962  5 Sheets-Sheet 1
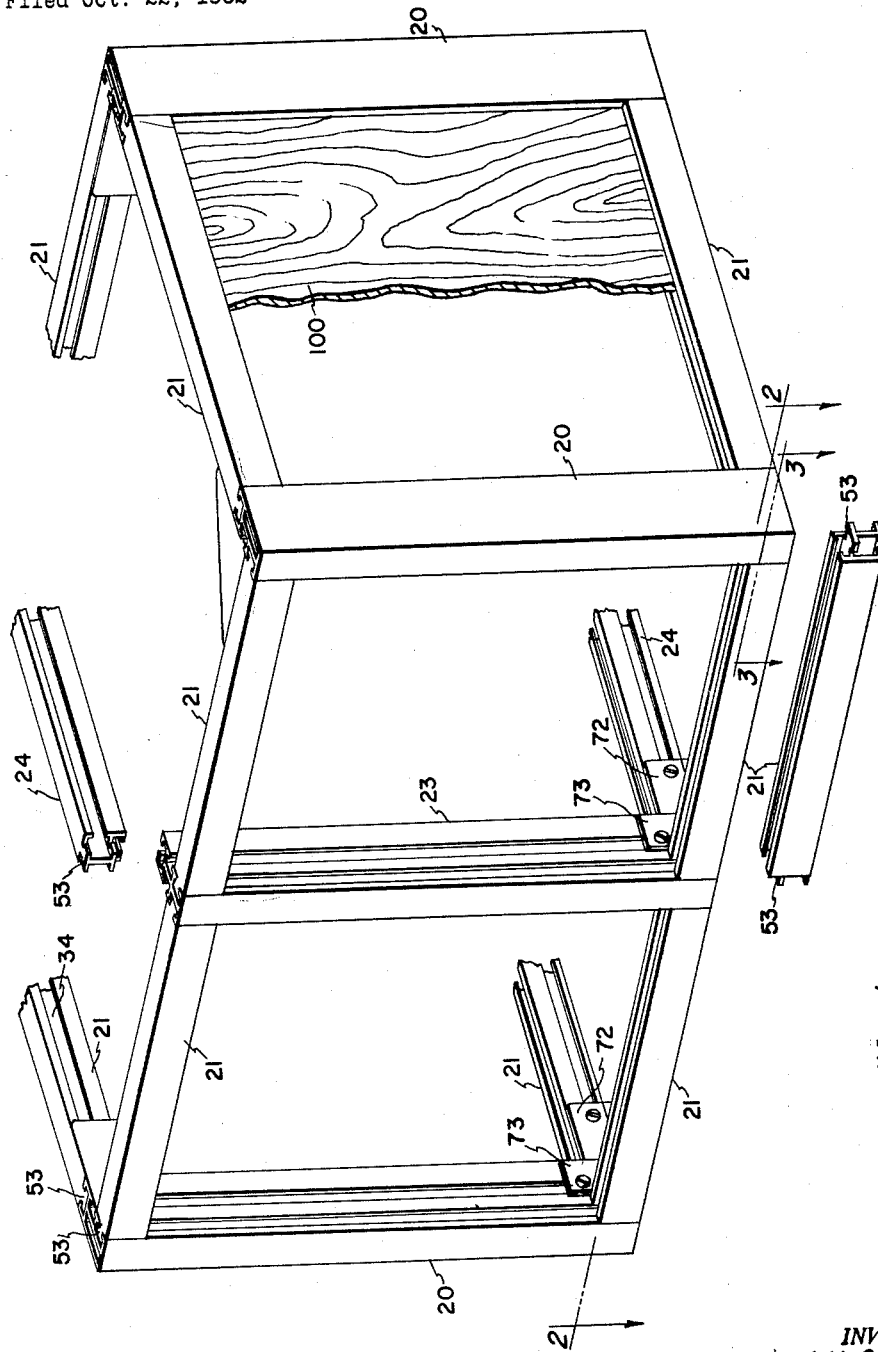
FIG—1
INVENTORS
Richard H. Chapman
Arthur J. Pulos
BY
D. Emmett Thompson
ATTORNEY

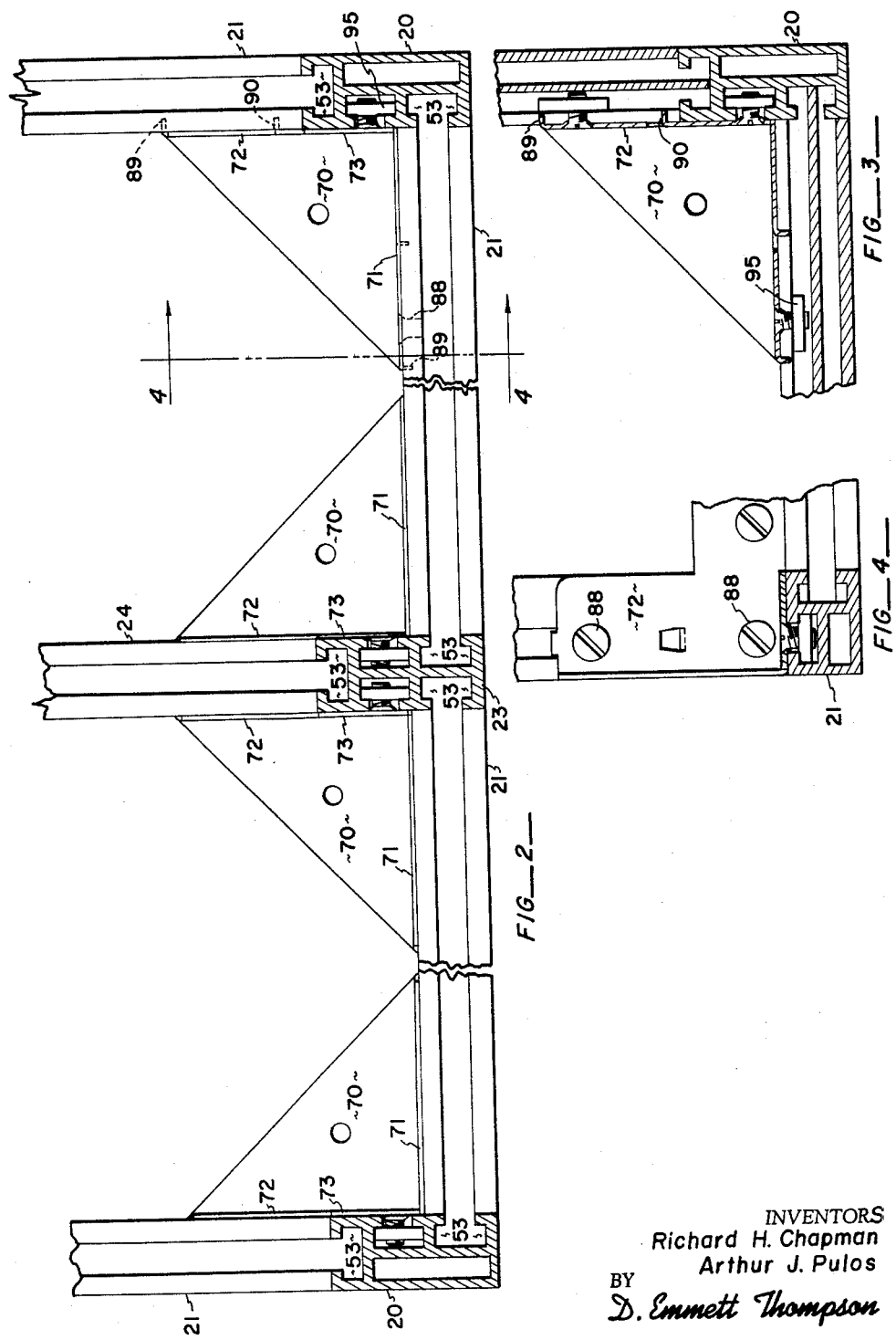

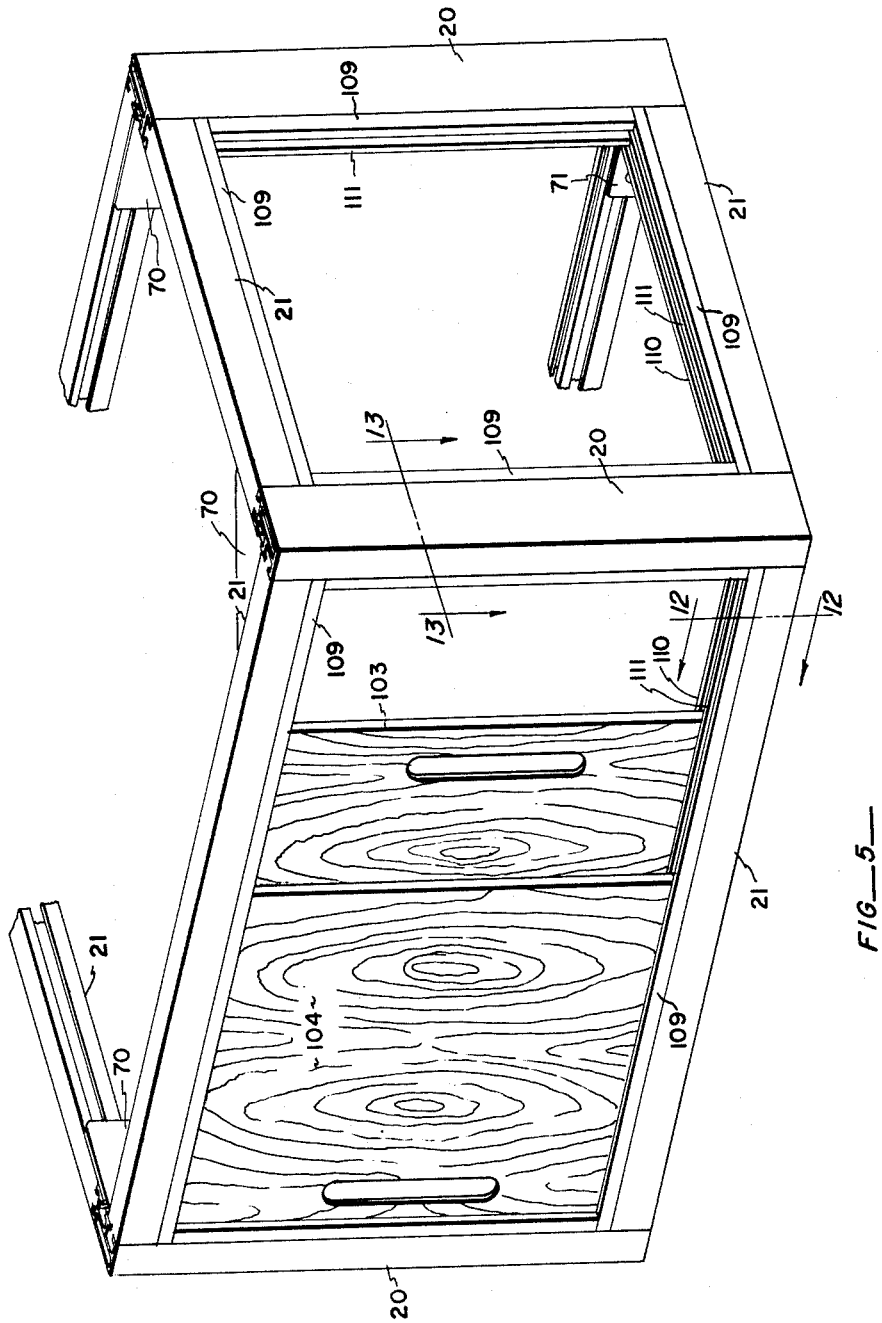

Sept. 29, 1964   R. H. CHAPMAN ETAL   3,150,903
FRAME STRUCTURE FOR CABINETS AND THE LIKE
Filed Oct. 22, 1962   5 Sheets-Sheet 4
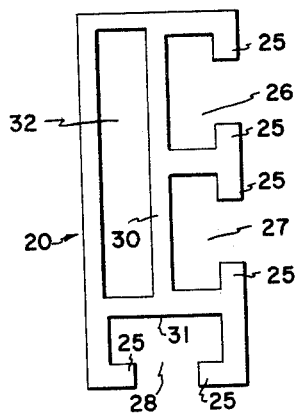
FIG—6—
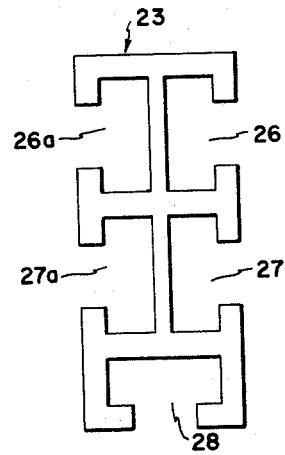
FIG—7—
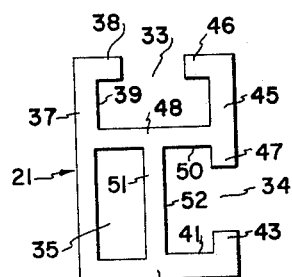
FIG—8—
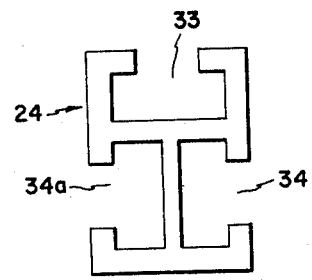
FIG—9—
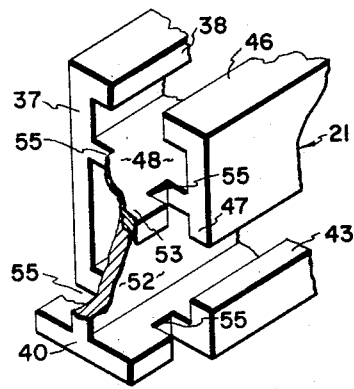
FIG—17—
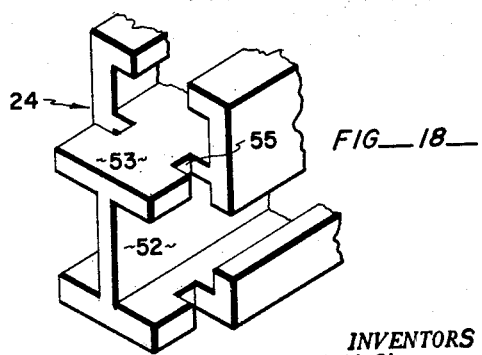
FIG—18—
INVENTORS
Richard H. Chapman
Arthur J. Pulos
BY
D. Emmett Thompson
ATTORNEY

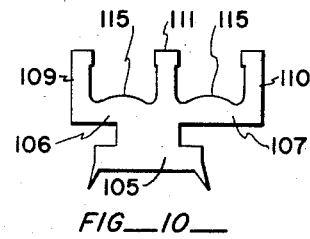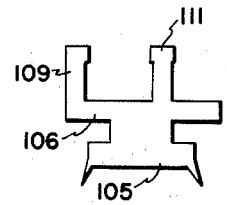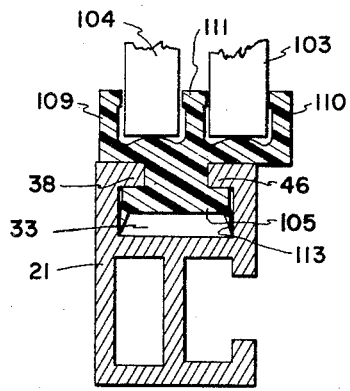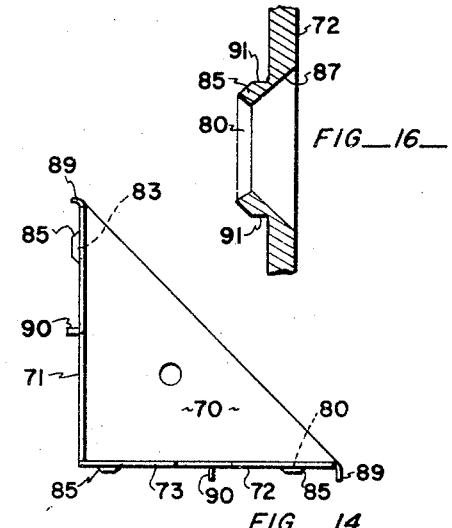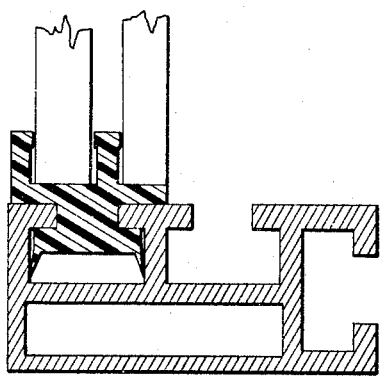

United States Patent Office 3,150,903
Patented Sept. 29, 1964

3,150,903
FRAME STRUCTURE FOR CABINETS AND
THE LIKE
Richard H. Chapman, Camillus, and Arthur J. Pulos,
Fayetteville, N.Y., assignors to Vega Industries, Inc.,
Syracuse, N.Y., a corporation of New York
Filed Oct. 22, 1962, Ser. No. 232,099
8 Claims. (Cl. 312—257)

This invention relates to frame structures for cabinets, desks, bookcases, and the like, consisting basically of corner posts, center posts, and horizontal rail members formed of rigid material by the extrusion process, and gusset members detachably secured to the horizontal rails and corner posts by fastener members.

The invention has as an object a frame structure of the type referred to, making use of extruded members which can be quickly and conveniently assembled into the cabinet structure by unskilled persons and, when assembled, the joints between the vertically disposed posts and horizontal rail members will meet in perfect registration, and the assembly will be particularly rigid and durable, resulting in a structure square and plumb, and requiring only the manipulation of a screw driver.

The invention has as a further object the inclusion in the cabinet frame structure of strips of extruded plastic material for the accommodation of a sliding door arrangement in one or more sides of the cabinet structure.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a partial diametric view of a cabinet structure embodying our invention.

FIGURE 2 is a view taken on line 2—2, FIGURE 1.

FIGURE 3 is a fragmentary sectional view taken on line 3—3, FIGURE 1.

FIGURE 4 is a view taken on line 4—4, FIGURE 2.

FIGURE 5 is a view, similar to FIGURE 1, but showing the cabinet structure provided with sliding doors in its front side.

FIGURE 6 is an end elevational view of the extrusion forming the corner posts of the cabinet.

FIGURE 7 is a view, similar to FIGURE 6, of the center posts.

FIGURE 8 is an end elevational view of the side rail.

FIGURE 9 is a view, similar to FIGURE 8, of the center rail.

FIGURE 10 is an end elevational view of the plastic strip mounted in the bottom and top rails at the front of the cabinet to accommodate sliding doors.

FIGURE 11 is a view, similar to FIGURE 10, of the plastic insertion strip mounted in the vertical rails at the front of the cabinet structure when sliding doors are employed.

FIGURE 12 is a view taken on line 12—12, FIGURE 5.

FIGURE 13 is a view taken on line 13—13, FIGURE 5.

FIGURE 14 is a top plan view of one of the gusset members.

FIGURE 15 is a view taken looking upwardly in FIGURE 14.

FIGURE 16 is an enlarged sectional view taken on line 16—16, FIGURE 15.

FIGURE 17 is an isometric view with parts broken away showing the T head formation on the ends of the horizontal outer rails.

FIGURE 18 is a view, similar to FIGURE 17, illustrating the T head formation on the center horizontal rails.

Referring to FIGURE 1, the cabinet structure consists of a corner post 20 disposed vertically at each corner of the frame structure. The corner posts 20 are connected by horizontally disposed rail members 21 extending between the upper and lower ends of the corner posts 20. Center posts 23 may also be employed and, where employed at the front and rear of the cabinet intermediate the corner posts, horizontally disposed center rails 24 extend between the upper and lower ends of the center posts 23. The posts 20, 23, and rails 21, 24, consist of extrusions formed of rigid material, such as aluminum, plastics, etc.

The corner posts, see FIGURE 6, consist of lengths of an extrusion formed with a pair of spaced parallel slots extending in a lengthwise direction and having inwardly directed flanges 25 to make the slots of T form 26, 27. The posts are formed with a single T slot 28 on one edge surface. The T slots 26, 27, on the side surface, and the T slots 28 on the edge surface, are all of the same dimension and form.

A web 30 forms the bottom wall of the slots 26, 27, and a transversely extending web 31 forms the bottom wall of the slot 28. The extrusions, forming the post 20, are cored out to provide rectangular passageways 32 extending lengthwise of the extrusions to eliminate unnecessary material and provide for the attachment of casters and the like, to the lower ends of the post, and for running concealed conductors.

The horizontal rails 21, see FIGURE 8, are extrusions having T slots 33, 34, on a pair of adjacent side surfaces. These extrusions also have a core passage 35 similar to the passage 32 in the corner posts. The side wall 37 of the extrusion forms one side wall 39 of the T slot 33 and has the inward extending flange 38. The side wall 40 of the extrusion forms one side wall 41 of the T slot 34 and has the inwardly extending flange 43. The opposite side wall of the T slot 33 is formed by the side wall 45 of the extrusion having the inwardly extending flange 46 and a like flange 47 for the T slot 34. A web 48 extends transversely between the walls 37 and 45, and forms the bottom wall of the T slot 33 and the end wall 50 of the slot 34. A vertically extending web 51 forms the bottom wall 52 of the slot 34.

When arranged in the frame structure, the corner posts 20 have their side surfaces containing the T slots 26, 27, in confronting relation. For purpose of clarity, this direction may be stated as being lengthwise of the cabinet. The side edge surfaces of the posts, containing the T slots 28, are arranged in confronting relation in the opposite direction, or transversely of the cabinet. The horizontal rails, when positioned intermediate the lower ends or portions of the corner posts, are arranged with their T slots 33 facing upwardly, and their T slots 34 facing inwardly. When these rails are mounted in the top of the structure, the T slots 33 face downwardly, and the T slots 34 face inwardly.

The ends of the rails 21 are formed with T heads 53 for reception in the T slots 26. These T heads are formed by removing the side walls 37 and 45, FIGURE 8, together with their flanges 38, 46, 47. The flange portion 43 of the wall 40 is also cut away. This results in the end portion of the rail being of I beam shape in cross section and of a length extending from the outer surface of the post flanges 25 to the bottom wall of the slot 26, see FIGURE 17. The web 52 of the rail constitutes the web of the I beam section and the web 48, together with the wall 40 of the rail, constitute the top and bottom flanges of the I beam section. These flanges are notched at their opposite sides, as at 55, to receive the flanges 25 of the T slot 26. With this structure, the T head end portion 53 of the rail can be inserted in the T slot 26 by moving the rail lengthwise of the corner post. This formation of the T heads 53 at the ends of the rails 21 is preferably done by milling to maintain the T head formation at close dimensional tolerance with the T slot 26, whereby the outer side 37 of the rail 21 abuts neatly and squarely against the corner posts, see FIGURE 1. Also, the T head formation prevents any separation between the rails and the posts.

The rails are detachably secured to the corner posts by gusset members, see FIGURES 2, 3, 4, 14 and 15. These gusset members are preferably formed of sheet metal and consist of a right triangular shaped base plate 70, the sides of which are folded perpendicular to the base to provide flanges 71, 72. These gusset members are made right and left hand. In FIGURES 14 and 15, the left-hand gusset is shown and in which the side flange 72 has an upwardly extending tab 73.

The gusset shown at the right hand of FIGURE 2, and in FIGURE 3, is shown in FIGURES 14 and 15. As previously stated, the T head end portions 53 of the horizontal rails 21 are positioned in the T slots 26, 28, of the corner posts 20. The gussets are positioned in the corner areas of the structure, with the flanges 71, 72, overlying the inner surface of the corner posts and the contiguous end portions of the horizontal rails 21. Referring to the right hand end portion FIGURE 2, the gusset flange 72 overlies the inner surface of the end rail 21 and the inner portion of the inner surface of the corner posts 20. The flange 71 overlies the inner surface of the rail 21 positioned at the front of the cabinet structure. The flanges 72, having the upwardly extending tabs 73, are formed with two apertures 80, 81, and the tab 73 is formed with an aperture 82, and the flange 71 is formed with an aperture 83. The material of the flanges 71, 72, about the apertures 80, 81, 82 and 83, is swedged outwardly to provide an annular bead 85. The forming punch forms a conical bore 87 in the flange and the bead 85, FIGURE 16, to provide a countersink for the reception of a flat head screw 88 by which the gussets are affixed to the rails 21 and the corner posts 20.

The flanges 71, 72, are formed at their free ends with outwardly extending tabs 89 and they are also formed intermediate their ends with similar tabs 90. The apertures 80, 81, 82 and 83, and the tabs 89, 90, are all arranged in a plane parallel to the base plate 70 in registration with the T slots 34 in the side rails 21. The apertures 81, 82, being arranged in a vertical plane to enter the T slot 27 in the corner posts 20, see FIGURES 2, 3 and 4. The beads 85, produced in the formation of the apertures 80, 81, 82, 83 are, upon formation, of conical shape. These beads 85 produce, in the formation of the apertures 80 and 83, are flattened off at their top and bottom sides, as at 91, FIGURE 16, the width between the flattened areas 91 being equivalent to the spacing between the flanges 43, 47, FIGURE 8, of the T slot 34 on the inner sides of the rails 21. The tabs 89, 90, have their top and bottom edges converging outwardly, as at 93, FIGURE 15. As previously stated, these tabs are in registration with the T slots 34 and the angularly extending top and bottom edges are drawn into tight engagement with the flanges 43, 47, when the screws 88 are tightened. This arrangement also serves to square up the joint between the rails in the corner posts and make certain that the various components of the cabinet structure are plumb and square. The screws 88 thread into nuts 95 positioned in the T slots 34 of the rails 21 and the screws extending through the apertures 81 extend into the T slots 27 of the corner posts in which the nuts 95 are positioned. The gussets, in addition to fixedly securing the rails and corner posts together, provide for the adequate support of bottom, tops and shelves in the cabinet structure.

The cabinet structure may be of such length as to include the center posts 23. These center posts, see FIGURE 7, are of like dimension to the corner posts 20 but are formed with a pair of T slots on each side surface— that is, these center posts are formed with the T slots 26, 27, and with T slots 26A, 27A, on the opposite side. The attachment of the ends of the horizontal rails 21 to the center posts embodies the same arrangement as their attachment to the corner posts, see FIGURE 2, and the gussets are employed in the same manner.

As previously stated, the horizontal rails 21 mounted at the bottom of the structure are arranged with their T slots 33 facing upwardly, and those at the top of the structure facing downwardly. This arrangement permits the reception of a panel 100, the upper and lower edges of which are positioned in the slots 33, and their vertical side edges are positioned in the slots 28 of the corner posts.

When center posts 23 are employed at the front and rear of the cabinet structure, the center rails 24 are employed. These rails are of identical formation to the rails 21, except that, see FIGURE 9, again these rails are provided with T slots on opposite side surfaces, as slots 34, 34A. These slots, together with the slots 34 in the rails 21 provide for the reception of the marginal edge portions of horizontally disposed panels for top and bottom closures for the cabinet structure. The upwardly facing slot 33 in the center rails 24, and the slots 28 in the edge surfaces of the center posts provide for the reception of the marginal edge portions of partition panels.

An arrangement employing the use of the center posts 23 and the center rails 24 is shown in FIGURE 1. In FIGURE 5 is shown a cabinet structure not employing the center posts and center rails. However, in this arrangement, the front side of the cabinet is provided with sliding panels or doors 103, 104. To accommodate the sliding doors 103, 104, without the necessity of using corner posts and horizontal rails of different construction, we provide adapter strips shown in FIGURES 10, 11, 12 and 13. In FIGURE 10 is shown the adapter strip that is positioned in the horizontal top and bottom rails 21. This strip is preferably formed of extruded plastic material and it consists of a T head portion 105 for insertion in the T slot 33 of the rails 21. The adapter strip is formed with laterally extending portions 106, 107, that are positioned on the flanges 38, 46, of the rails 21. These laterally extending portions 106, 107, are formed with flanges 109, 110, extending outwardly from the rails 21. A centrally located divider flange 111, in conjunction with the flanges 109, 110, forms a pair of grooves extending parallel of the strip and the rail and in which the doors 103, 104, are mounted for sliding action.

In FIGURE 11 is shown a similar adapter strip for insertion in the T slots 26 and 28 of the corner posts. This strip is of the same general form and of like dimension to the strip shown in FIGURES 10 and 12, with the exception that it is not provided with the inner flange 110. It will be understood that if the cabinet structure embodies the center posts 23, the strips shown in FIGURE 11 are also inserted in the T slots 26, 26A, of the center posts. The head portion 105 of these adapter strips may be formed with thin inwardly extending resilient flanges 113 which are formed to flare outwardly into engagement with the side walls of the T slots to eliminate any possibility of the adapter strips becoming loosened in the T slots. The bottom walls of the grooves formed by the flanges 109, 110, 111, are preferably convexed as at 115, FIGURE 10, to reduce the area of contact between the upper and lower edges of the sliding doors 103, 104 and accordingly, reduce the frictional engagement during sliding movement of the doors in the strips.

The right end of the structure shown in FIGURE 5 is also provided with the adapter strips in the corner posts 20 and the upper and lower horizontal rails 21. The strips in these members at the end of the cabinet structure could, of course, be omitted and the end provided with a closure panel. However, if the end of the cabinet is going to be exposed, it may be desired to use the adapter strips to provide a trim appearance comparable with the front of the cabinet in which the sliding door arrangement is employed.

It will be apparent our cabinet structure embodies a particularly economical arrangement in requiring only four post and rail extrusions to provide a multiple unit cabinet structure, and only two extrusions—namely, the corner posts and rails 21 for single unit structures. The adapter strips permit the use of sliding door arrangements, if desired, without the necessity of providing special extrusions for such use. It will be understood that swing or hinge doors may be employed and, in that connection, the slots 26 in the corner posts and the slots 26, 26A, in the center posts, are available for the mounting of door hinges.

What we claim is:

1. A frame structure for cabinets and the like comprising a corner post vertically disposed in each corner of the structure, each corner post being a metallic extrusion rectangular in cross section and being formed on one side with a plurality of T slots extending lengthwise of the posts and said posts being formed with a single T slot extending lengthwise in one edge thereof, horizontally disposed rails extending from one corner post to another, said rails being formed with T slots on their inner sides, a gusset positioned at the joinder of each end of said rails and the contiguous corner post, each of said gussets having a right angle shaped base with flanges extending vertically from the side edges of said base, said flanges overlying the inner sides of the end portions of said rails and a portion of the inner side of the contiguous post, each of said flanges being formed with projections extending into T slots in said rails and fasteners extending through said flanges into the T slots of said rails and one of said plurality of slots in said corner post and being cooperable therewith to detachably secure said rails to the corner posts.

2. A frame structure for cabinets and the like comprising a corner post vertically disposed in each corner of the structure, each corner post being an extrusion rectangular in cross section, each of said extrusions being formed on one side surface with a plurality of T slots extending lengthwise thereof in parallel spaced relation, and said posts being formed with a T slot in one edge surface, said corner posts being arranged with their side surfaces in confronting relation in a direction lengthwise of the structure and their edge surfaces in confronting relation in a direction transversely of the structure, center posts positioned intermediate said corner posts in a direction lengthwise of the structure and being formed with a plurality of T slots on opposite side surfaces arranged in confronting relation with the side surfaces of said corner posts, horizontally disposed rails extending between the confronting edge surfaces of said corner posts and between the confronting side surfaces of said corner posts and said center posts, said side rails being formed with T heads positioned in certain of said T slots in said corner and center posts, said rails being also formed with T slots on their inner side surfaces, a gusset bracket secured to each corner post and center post and to the contiguous end portions of said horizontal rails, said gussets being detachably secured to said corner posts and center posts by fasteners extending into certain of said T slots in the side surfaces of said posts, and other fasteners extending into the T slots in said rails.

3. A frame structure for cabinets and the like comprising a corner post vertically disposed in each corner of the structure, each corner post being an extrusion rectangular in cross section, each of said extrusions being formed on one side surface with a plurality of T slots extending lengthwise thereof in parallel spaced relation, and said posts being formed with a T slot in one edge surface, said corner posts being arranged with their side surfaces in confronting relation in a direction lengthwise of the structure and their edge surfaces in confronting relation in a direction transversely of the structure, center posts positioned intermediate said corner posts in a direction lengthwise of the structure and being formed with a plurality of T slots on opposite side surfaces arranged in confronting relation with the side surfaces of said corner posts, horizontally disposed rails extending between the confronting edge surfaces of said corner posts and between the confronting side surfaces of said corner posts and said center posts, said side rails being formed with T heads positioned in certain of said T slots in said corner and center posts, said rails being also formed with T slots on their inner side surfaces, a gusset bracket secured to each corner post and center post and to the contiguous end portions of said horizontal rails, said gussets being formed with projections extending into the T slots in said rails and one of said plurality of slots in said corner posts and said center posts, said gussets being detachably secured to said corner posts and center posts by fasteners extending into certain of said T slots in the side surfaces of said posts, and other fasteners extending into the T slots in said rails.

4. A frame structure for cabinets and the like comprising a corner post vertically disposed in each corner of the structure, each corner post being a metallic extrusion rectangular in cross section and being formed on one side surface with a plurality of T slots extending lengthwise of the posts, and said posts being formed with a single T slot extending lengthwise of one edge surface thereof, said corner posts being arranged with their side surfaces in confronting relation in a direction lengthwise of the structure and their edge surfaces in confronting relation in a direction transversely of the structure, horizontally disposed rails extending from one corner post to another, said rails being formed with T slots on their inner side surfaces, said rails being also formed with T head portions positioned in certain of said T slots in said corner posts, a gusset positioned at the joinder of each corner post and said rails, each of said gussets having a right angle shaped base with flanges extending vertically from the side edges of said base, said flanges overlying the inner side surfaces of the end portions of said rails and a portion of the inner side of the contiguous corner post, fasteners extending through said flanges into the T slots of said rails and one of said plurality of slots in said corner posts, said fasteners being cooperable to detachably secure said gussets to said posts and rails.

5. A frame structure for cabinets and the like comprising a corner post vertically disposed in each corner of the structure, said corner posts being formed with a T slot in one side surface and a T slot in an adjacent edge surface, said corners posts being arranged with their surfaces containing said T slots in confronting relation, horizontally disposed rails extending between the confronting surfaces of said posts and being formed with lengthwise extending T slots in one side surface, said horizontal rails being secured at their ends to said posts with the T slots in said rails in registration with the T slots in said vertical corner posts, a door guide strip formed with a T head portion positioned in the T slots of said rails and said posts, each of said guide strips being formed with door guiding flanges extending in spaced parallel relation for the reception and guiding of sliding doors.

6. A cabinet structure as defined in claim 5, wherein said guide strips consist of extruded plastic material, the T head portions of said strips being deformable for insertion in the T slots of said rails and posts.

7. A cabinet structure as defined in claim 1, wherein the projections of said gusset flanges consist of tabs bent outwardly from said flanges.

8. A cabinet structure as defined in claim 1, wherein said projections formed in said gusset flanges consist of annular ribs encircling apertures for the reception of said fasteners, certain of said annular ribs being flattened on opposite sides for insertion into said T slots.

References Cited in the file of this patent

UNITED STATES PATENTS

| | | |
|---|---|---|
| 1,846,485 | Hart | Feb. 23, 1932 |
| 2,329,815 | Attwood | Sept 21, 1943 |
| 2,380,379 | Attwood | July 31, 1945 |
| 2,580,029 | Krauss | Dec. 25, 1951 |
| 2,877,511 | Viola | Mar. 17, 1959 |

FOREIGN PATENTS

| | | |
|---|---|---|
| 132,630 | Germany | July 10, 1902 |
| 192,478 | Great Britain | Feb. 1, 1923 |